Aug. 15, 1944.  R. I. N. WEINGART  2,355,688
MOVEMENT TRANSMISSION SYSTEM FOR MEASURING INSTRUMENTS
Filed April 24, 1943

INVENTOR.
Richard I. N. Weingart
BY John P. Chandler
his attorney

Patented Aug. 15, 1944

2,355,688

UNITED STATES PATENT OFFICE 2,355,688

MOVEMENT TRANSMISSION SYSTEM FOR MEASURING INSTRUMENTS

Richard I. N. Weingart, Glen Head, N. Y.

Application April 24, 1943, Serial No. 484,393

8 Claims. (Cl. 73—151)

This invention relates to an improved movement for measuring instruments having some means responsive to changes in conditions, such as temperature, pressure, or the like. In instruments of this general character, the responsive element is usually connected with a toothed segmental gear which drives a pinion associated with the pointer shaft. A movement which is more accurate and generally more satisfactory comprises a helical element carried on the pointer shaft, and a substantially sector-shaped driving gear which is connected with the responsive element, such as a Bourdon tube, bellows, or the like, the gear having a single, elongated driving face which is disposed generally to the lead angle of the helical element, and which contacts such helical element. A movement of this type is disclosed in Patent No. 2,294,869, and provides a driving gear for turning the pointer shaft in one direction, and a hair spring to turn it in the opposite direction as such opposite rotation is permitted by opposite rotation of the driving gear.

The present invention relates to an improved movement of this general type wherein friction of the moving parts is considerably reduced. One of the objections to a movement of the kind disclosed in the aforementioned patent resides in the fact that both the driving shaft and the driven shaft have a thrust longitudinal of their axes, since the driving gear exerts a thrust on the helical element longitudinally of its axis during the driving operation. This thrust is opposed by a thrust bearing, as shown in this patent. It is an object of the present invention to provide an improved structure wherein such longitudinal thrust is not transmitted to either shaft, and wherein the movement has a high degree of accuracy and a long life.

Another object of the invention is to provide an improved movement of this general character wherein the thrust longitudinally of the axis of the helical element is opposed by a second, generally sector-shaped gear member, which contacts a thrust surface associated with the helical element, and which rotates with the driving gear, thus providing a true rolling action between such second or supporting gear and the thrust surface, just as is provided between the driving gear and the helix element. A movement constructed in accordance with the foregoing eliminates all longitudinal thrusts on both the driving and the driven shafts, eliminates a major portion of the friction on the bearings and other moving parts which is a necessary incident of the movement of the patent referred to, and the movement is only slightly affected by vibration.

The peripheral driving edge of the driving gear should be an element of a cylinder if true rolling action is to be obtained. The peripheral supporting edge of the supporting gear is likewise an element of the same cylinder, and its entire driving edge lies in one plane which is at right angles to the axis of the driven shaft. Any variation of the peripheral edge of the supporting gear from this plane produces, when the supporting gear is rotated, movement of the thrust surface and the helix longitudinally of their axes. This longitudinal movement causes rotary action in the helix and its driven shaft independent of such rotary action caused by rotation of the driving gear, resulting from screw action between the driving gear and the helix, and this action may be used in calibrating the instrument in which the movement is used.

Another object of the invention is to provide a movement transmission system of the character described wherein calibration can be accomplished without changing the surface of the driving gear. The supporting gear is formed of sheet metal or other bendable material, and the contour of the peripheral edge may accordingly be varied to accomplish this calibration.

A further object of the present invention is the provision of a movement transmission system for measuring instruments wherein the driving element comprises a plurality of driving gears, one of such gears exerting a thrust against the helical driven element, and the other of such gears supporting the helical element, thus receiving the longitudinal thrust on the helical element, the second gear also imparting frictional driving action to the driven member.

Another object of the present invention is the provision of a novel movement including a driving shaft, driven shaft, and driving and driven gears, and wherein movement of the driving shaft longitudinally of its axis does not impart rotation to the driven shaft. Yet another object of the invention is to provide a movement wherein a driven helical element will be restrained from movement longitudinally of its axis with relation to its driving element when subjected to vibration or shock.

Figure 3:
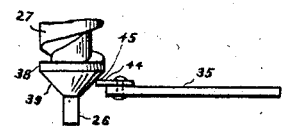

Fig. 3 is a detailed side elevation of the lower end of the helical driving element and the supporting gear.

Figure 4:
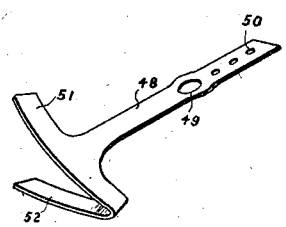

Fig. 4 is a perspective view of a modified form of combination driving gear and supporting gear.

Figure 5:
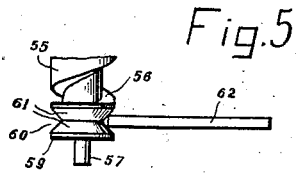

Fig. 5 is a broken plan view showing a modified form of restraining means for the driven element.

Figure 1:
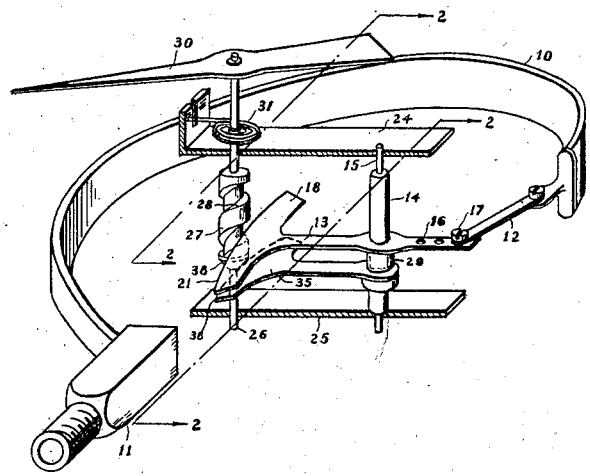
Fig. 1 is a perspective view of a movement constructed in accordance with the present invention, shown in connection with a Bourdon type of pressure gauge.
Figure 2:
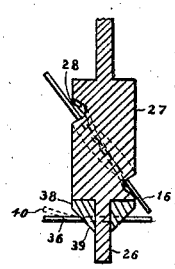
Fig. 2 is a broken section taken on line 2—2 of Fig. 1, the view not showing the frame elements.

The structure illustrated in Figs. 1, 2 and 3 includes a Bourdon tube 10 mounted in a socket 11 and provided at its free end with a pivoted link 12. The driving portion of the movement comprises a lever 13 which is substantially centrally mounted on a shoulder portion 14 formed on shaft 15. One end of lever 13 is provided with a plurality of spaced holes 16, one of such holes receiving a pivot pin 17 at one end of link 12. The several holes are for purpose of calibration. At the opposite end of the lever 13, the driving gear 18 is carried. The peripheral driving edge 21 of the gear is an element of a cylinder, and such driving edge is generally disposed to the lead angle of the helical element which will presently be described. This arm 13 and driving gear 21 may, if desired, be formed from a single blank of sheet metal, and the driving face appropriately twisted to the proper contour.

Shaft 15 is journalled in frame members 24 and 25, as is driven shaft 26. The helical element 27 is mounted on, and keyed to, the driven shaft, and in this instance is shown as being formed from a cylindrical blank of metal rod having the spiral recess 28 cut therein. In this arrangement, the driving face of the gear 18 is the lower marginal edge of such gear, which edge contacts the lower surface of the spiral recess. Clockwise rotation of the pointer 30 and pointer shaft 26 is imparted by hair spring 31, and counter-clockwise rotation of the shaft is caused by driving gear 18.

Movement of driving gear 18 acting against the face of the spiral imparts a force against the face of the helical element, which has several components, one of which acts in a direction parallel with the axis of the helix. This thrust is opposed by the following novel mechanism. A second gear 35 is also carried by, and is secured to, a shoulder 14, but is spaced from lever 13 by means of a sleeve 29 carried on shoulder 14. The marginal edge 36 of this gear is an element of the same cylinder as is driving gear 18, so that such edge is a projection of edge 21, lying, however, in a single plane at right angles to the axis of rotation of the driven shaft. The particular means for mounting gears 13 and 35 on shaft 15 is, of course, a matter of choice, it being only necessary that each of these gears be rigidly mounted on the shaft and rotate together. This edge of gear 35 contacts a thrust member 38 carried on the driven shaft 26 and formed with a tapered lower or thrust surface 39, which has the general contour shown in Figs. 2 and 3.

Helical element 27 was earlier described as being mounted on, and keyed to, shaft 26. If preferred, however, the structure illustrated in Fig. 2 may be employed wherein the helical element is formed integrally with the shaft. In the event that the spiral recess 28 terminates short of the terminal of the helical element 27, thrust member 38 may then be formed integrally with the helical element and the shaft. In accordance with common practice, however, the spiral recess 28 is cut into a relatively long length of the metal rod, and such rod then cut to appropriate length, and the shaft terminals then machined thereon. Thrust element 38 is then force-fitted on the shaft.

The precise taper of this thrust surface 39 may vary somewhat within limits, although the taper should preferably be sufficient to provide a point contact between the driving edge 36 of supporting gear 35 and the thrust surface 39, since if there is a surface engagement between gear 35 and this thrust-bearing surface 39, a certain measure of friction is caused. It will be obvious, however, that the point contact is preferable. The angle of surface 39 should desirably be sufficient to permit of calibration of the instrument by means of varying the contour of driving edge 36 of gear 35. This calibration may, of course, be effected by two means, either the bending of the driving edge out of a plane at right angles to the axis of the driven shaft, as shown by dotted lines 40 in Fig. 2, or by so forming the peripheral edge 39 in a manner not to constitute an element of a true cylinder, in which case longitudinal motion of the driven shaft will be caused as that portion of the driving edge approaches or recedes from the element of a true cylinder.

Commercially, however, it is advisable to make both driving edges 21 and 36 elements of the same cylinder, and accordingly the pitch-line velocity of driving edge 21 of gear 18 is the same as the pitch-line velocity of the face of the recess 28 which it contacts. The same is true of the respective pitch-line velocities of driving edge 36 of gear 35, and of that portion of thrust surface 39 which it contacts. By forming the driving edge 36 of gear 35 and the thrust surface 39 in this manner, gear 35 in addition to providing its supporting function, which is of the utmost importance, also imparts frictional rotation to the thrust surface, and accordingly to the driven shaft. This fact accounts for a further marked reduction in friction of the several moving parts. Gears 18 and 35 have been described as formed from sheet metal, although an alternative form is shown in Fig. 3 wherein supporting gear 35 is formed with a non-metallic element 44 having a driving edge 45 which again makes the point contact with thrust surface 39. This non-metallic element or facing, which considerably reduces wear between the parts, may be formed from plastic material, or any other suitable material.

In Fig. 4, an alternative form of gear is provided wherein the driving gear, the supporting gear, and the lever are formed from a single piece of sheet metal. In this instance, the lever 48 is formed with an aperture 49 which receives the supporting shaft, and with a plurality of apertures 50, one of which receives the pin at the free end of the link which is connected with the condition-responsive mechanism. Driving gear portion 51 lies at an angle to lever 48, and supporting gear 52 is formed integrally with one terminal portion of gear portion 51. This embodiment of the invention may likewise have the non-metallic facing shown in Fig. 3.

In the commercial production of measuring-instrument movements embodying the present invention, the entire peripheral driving edge of the driving gear usually lies in a single plane, which plane, when the central portion of the gear contacts the helical surface of the helical element, is generally tangent to such element at the point of contact. As the gear rotates toward one of its terminals or the other, the plane of such gear assumes a more acute or obtuse angle relative to the driven face of the helical element at its then point of contact, depending upon its direction of rotation. Accordingly, it is difficult to define this varying relationship of the peripheral driving edge of the gear to the helical element. For convenience of expression, this relationship is referred to in the appended claims as one in which the peripheral driving edge is generally disposed to the lead angle of the helical element. In the theoretical or ideal state, the driving element in a movement such as herein described is a helix of larger diameter than that of the driven element, but having the same lead angle as the helical driven element. In this case, it would be truly disposed, i. e. tangent, to the driven element throughout its length.

A modified form of means for restraining movement of the driven element longitudinally of its axis is shown in Fig. 5. In this case, the driven element 55 is formed with the spiral recess 56 and carries a shaft terminal 57. The thrust element, in this case, comprises a circular member 59 having an annular recess 60 therein, thus forming opposed thrust faces 61. Supporting gear 62 in this instance may contact both of these thrust faces, thus restraining longitudinal movement of the driven element in either direction. This arrangement is particularly successful in cases wherein the driving gear presents a true helical surface and contacts the opposed faces of the spiral recess, thereby driving the helical element in both directions. It is also important in restraining such movement of the helical element longitudinally of its axis as may be caused by shock or vibration. The supporting gear 62 may, in this case, or in any other case, be formed integrally with the driving gear, as shown in Fig. 4. Likewise, it is important to point out in connection with the structure shown in Fig. 4 that if gear 51 is used as the supporting gear, it may lie on the same plane as lever 48, eliminating the necessity of twisting the same. In this case, gear 52 will be the driving gear and will lie at an angle generally disposed to the helical driven surface.

The several embodiments of the invention shown and described herein are for purpose of illustration only and are not to be taken in any limiting sense. It will also be apparent that many changes and modifications may be made in the structures illustrated and described without departing from the spirit of the invention, as defined by the appended claims.

What I claim is:

1. A movement for a measuring instrument having means responsive to changes in conditions, said movement comprising a shaft, a helical driven element associated with said shaft, and a driving gear for driving the driven element, means connecting the driving gear with the condition-responsive means, and means for restraining movement of the driven element longitudinally of its axis comprising a thrust element carried by the shaft and a second gear movable with the driving gear, contacting said thrust element.

2. A movement for a measuring instrument having means responsive to changes in conditions, said movement comprising a helical driven element and a driving element comprising a driving gear formed with a driving face which contacts the helical element and produces rotation thereof by exerting a thrust against the helical surface, a driven shaft associated with the helical element, pivotal means for mounting the driving gear and means connecting the driving gear with the condition-responsive means, and means for opposing movement of the shaft longitudinally of its axis comprising a thrust-receiving element carried by the shaft and a second gear associated with the driving gear contacting said thrust-receiving element.

3. A movement for a measuring instrument having means responsive to changes in conditions, said movement comprising a driven shaft, a helical element associated with the driven shaft, a pivoted driving gear formed with a gear face which exerts a force against such helical element to rotate the same, means connecting the driving gear with the condition-responsive element, a thrust element positioned on the driven shaft, and a supporting gear carried by the driving gear and formed with a face which contacts the thrust element and opposes longitudinal movement of the shaft.

4. A movement for a measuring instrument having means responsive to changes in conditions, said movement comprising a driven shaft carrying a pointer, a helical element associated with the driven shaft, driving means comprising a plurality of gears, a shaft upon which said gears are carried, both of said gears having driving edges which constitute elements of the same cylinder, the driving edge of one of such gears being disposed generally to the lead angle of the helical element and contacting a face of such element, and causing rotation thereof in one direction by exerting a force against such helical element, one component of such force being a thrust parallel with the axis of such element, spring means for rotating the helical element and the pointer shaft in the opposite direction, means for opposing such thrust parallel to the axis of the helical element and driven shaft, comprising the second gear and a thrust element carried by the shaft, the second gear contacting such thrust element, and means connecting the driving gears with the condition-responsive means.

5. A movement for a measuring instrument having means responsive to changes in conditions, said movement comprising a driven shaft, a helical element associated with the driven shaft, a pivotal driving gear formed with an elongated gear face lying on an angle generally disposed to the lead angle of the helical element, and exerting a force on such helical element to rotate the same in one direction, and spring means for rotating the shaft in the opposite direction, means connecting the driving gear with the condition-responsive element, a thrust element associated with the driven shaft, and a supporting gear carried by the driving gear and formed with a driving face lying in a single plane at right angles to the axis of the driven shaft, such driving face contacting the thrust element and opposing such thrust as is parallel to the axis of the helical element, which thrust is imparted to it by the driving gear acting against its surface.

6. A movement for a measuring instrument having means responsive to changes in conditions, said movement comprising a helical driven element and a driving element comprising a driving gear formed with a driving face, a driven shaft associated with the helical element, a shaft mounting the driving gear and means connecting the driving gear with the condition-responsive means, spring means for rotating the driven shaft in one direction, the driving gear rotating said shaft in the opposite direction by exerting a force against the helical element, and means for opposing the thrust parallel to the axis of the helical element caused by such force, comprising a thrust-receiving element carried by the shaft, and a second gear carried by the gear shaft contacting said thrust-receiving element.

7. A movement for a measuring instrument having means responsive to changes in conditions, said movement comprising a driven shaft, a helical element associated with the driven shaft, driving means comprising a plurality of gears, a shaft upon which said gears are carried, means connecting the gears with the condition-responsive element, the driving edge of one of such gears being disposed generally to the lead angle of the helical element and contacting a face of such element, and causing rotation thereof by exerting a thrust against such face, and means for restraining movement of the helical element longitudinally of its axis, comprising a thrust element carried by the driven shaft, the second gear contacting such thrust element.

8. A movement for a measuring instrument having means responsive to changes in conditions, said movement comprising a driven shaft, a helical element associated with the driven shaft, driving means comprising a plurality of gears, means connecting such gears with the condition-responsive element, a shaft upon which said gears are carried, the driving edge of one of such gears being disposed generally to the lead angle of the helical element and contacting the face of such element, and causing rotation thereof by exerting a thrust against such face, and means for controlling movement of the helical element longitudinally of its axis, comprising a thrust element carried by the driven shaft and having an annular recess therein, the second gear contacting the recess in such thrust element, thus limiting longitudinal movement of the driven shaft to that permitted or caused by the second gear.

RICHARD I. N. WEINGART.